(12) United States Patent
Sekii et al.

(10) Patent No.: US 7,708,316 B2
(45) Date of Patent: May 4, 2010

(54) SCRAPER STRUCTURE FOR VEHICLE

(75) Inventors: Bunzo Sekii, Wako (JP); Yoshihiro Kimura, Wako (JP); Makoto Hotozuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 12/042,017

(22) Filed: Mar. 4, 2008

(65) Prior Publication Data
US 2008/0238078 A1 Oct. 2, 2008

(30) Foreign Application Priority Data
Mar. 30, 2007 (JP) ............................. 2007-093535

(51) Int. Cl.
*B60S 1/68* (2006.01)
(52) U.S. Cl. ...................... 280/855; 280/856
(58) Field of Classification Search ................. 280/855, 280/856; 464/170
See application file for complete search history.

(56) References Cited

U.S. PATENT DOCUMENTS 6,776,698 B2 * 8/2004 Pepin et al. ................. 451/434

2005/0167179 A1 * 8/2005 Hasegawa et al. ........... 180/348
2007/0284856 A1 * 12/2007 Shimizu et al. ............. 280/727
2008/0053762 A1 * 3/2008 Nakamura et al. ...... 188/218 A

FOREIGN PATENT DOCUMENTS

JP 2006-071042 3/2006

* cited by examiner

*Primary Examiner*—Paul N Dickson
*Assistant Examiner*—Erez Gurari
(74) *Attorney, Agent, or Firm*—Ditthavong Mori & Steiner, P.C.

(57) ABSTRACT

A scraper structure for a vehicle includes a scraper for scraping material accumulated inside a disk wheel of a wheel. The scraper is detachably attached to a lower surface of a knuckle which rotatably supports the wheel. The scraper includes an extending portion and a bent portion. The extending portion extends inwardly in terms of a vehicle body and downwardly from the lower surface of the knuckle. The bent portion is formed by bending a lower end of the extending portion toward a front in terms of the vehicle body.

2 Claims, 6 Drawing Sheets

SCRAPER STRUCTURE FOR VEHICLE

CROSS-REFERENCE TO RELATED APPLICATIONS

The present application claims priority under 35 U.S.C. §119 to Japanese Patent Application No. 2007-093535, filed Mar. 30, 2007, entitled "Scraper Structure For Vehicle." The contents of this application are incorporated herein by reference in their entirety.

BACKGROUND OF THE INVENTION

1. Field of the Invention

The present invention relates to a scraper structure for a vehicle.

2. Discussion of the Background

Some of rough-terrain traveling vehicles include a scraper for scraping accumulated mud, snow, ice or the like because the mud, snow, ice or the like may be accumulated inside disk wheels of wheels when traveling on the rough terrain.

JP-A-2006-71042 discloses such a scraper structure for a vehicle. The scraper structure has a protruding portion on a brake caliper which constitutes a disk brake. The protruding portion is used as a scraper.

FIG. 3 and FIGS. 9(a) and 9(b) in JP-A-2006-71042 will be described below.

In FIG. 3, a knuckle 88 is attached to a suspension arm attached to a vehicle body of a vehicle, a brake caliper 111 which constitutes a disk brake device is attached to the knuckle 88, and a protruding portion 131C as a scraper is formed at the upper end portion of a caliper bracket 131 provided on the brake caliper 111.

In FIGS. 9(a) and 9(b), the protruding portion 131C is a part to scrape snow 201 or the like accumulated on the inner surface of rims 154a of a disk wheel 154.

Since the protruding portion 131C is provided at the end of the caliper bracket 131, it is supposed that even when the protruding portion 131C scrapes the snow 201, the scraped snow 201 falls on the inner surface of the lower rim 154a of the disk wheel 154 and is accumulated again.

Furthermore, when a large amount of snow 201 is accumulated inside the disk wheel 154, a structure to allow easy discharge of the snow 201 out of the disk wheel 154 is necessary as well as to simply scrape the snow 201.

SUMMARY OF THE INVENTION

According to one aspect of the present invention, a scraper structure for a vehicle includes a scraper for scraping material accumulated inside a disk wheel of a wheel. The scraper is detachably attached to a lower surface of a knuckle which rotatably supports the wheel. The scraper includes an extending portion and a bent portion. The extending portion extends inwardly in terms of a vehicle body and downwardly from the lower surface of the knuckle. The bent portion is formed by bending a lower end of the extending portion toward a front in terms of the vehicle body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. The drawings are to be viewed in an orientation in which the reference numerals are viewed correctly.

Figure 1:
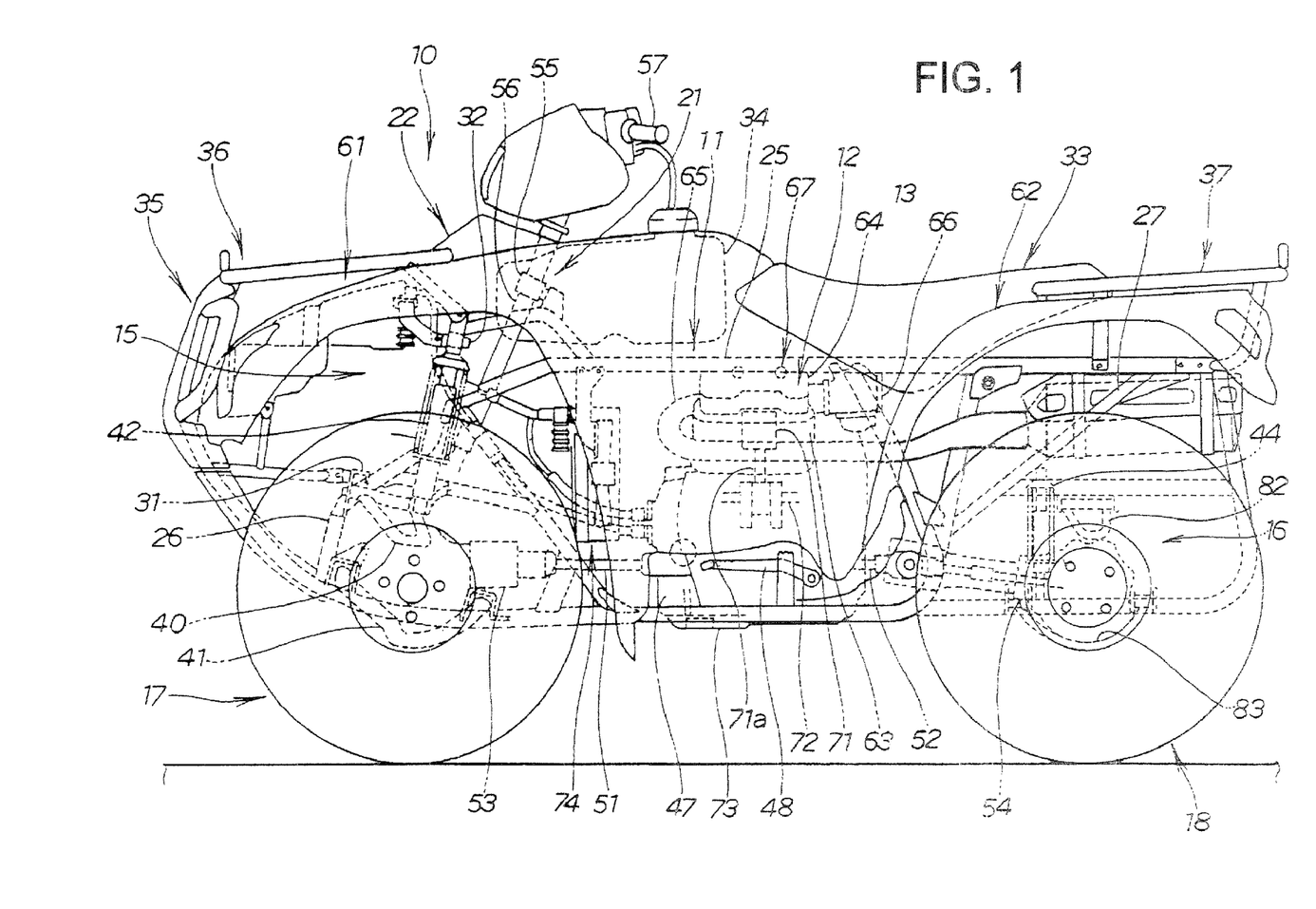
FIG. 1 is a side view of a vehicle provided with a scraper structure according to an embodiment of the present invention.

FIG. 1 is a side view of a vehicle having a scraper structure according to an embodiment of the present invention. A vehicle 10 is a rough-terrain traveling vehicle including a vehicle body frame 11, an engine 12 mounted at the lower center of the vehicle body frame 11, a power transmitting device 13 connected to the engine 12, a front suspension 15 and a rear suspension 16 for suspending left and right front disk wheels 17, 17 (only the reference numeral 17 on the near side is shown) and left and right rear disk wheels 18, 18 (only the reference numeral 18 on the near side is shown), and a steering device 21 connected to the front disk wheels 17, 17 and attached to the vehicle body frame 11.

The vehicle body frame 11 includes a main frame 25, a front frame 26 and a rear frame 27 attached to the front and back of the main frame 25, a bracket 31 attached between left and right of the lower portion of the front frame 26, and a cross member 32 attached between left and right of the upper portion of the front frame 26.

Here, reference numeral 33 designates a seat attached to the main frame 25, reference numeral 34 designates a fuel tank, reference numeral 35 designates a front guard attached to the front frame 26, reference numeral 36 designates a front carrier attached to the front frame 26, and reference numeral 37 designates a rear carrier attached to the rear portion of the main frame 25.

The front suspension 15 is a suspension of a left and right independent type, and includes a pair of left and right upper arms 40, 40 (only the reference numeral 40 on the near side is shown) and lower arms 41, 41 (only the reference numeral 41 on the near side is shown) attached to the vehicle body frame 11 so as to be capable of swinging in the vertical direction, and a pair of left and right front cushion units 42, 42 (only the reference numeral 42 on the near side is shown) attached respectively between the upper arms 40 and the cross member 32.

The rear suspension 16 is a suspension of a left and right independent type, and includes a pair of left and right upper arms 82, 82 (only the reference numeral 82 on the near side is shown) and lower arms 83, 83 (only the reference numeral 83 on the near side is shown) attached to the vehicle body frame 11 so as to be capable of swinging in the vertical direction, and a pair of left and right rear cushion units 44, 44 attached respectively between the vehicle body frame 11 and the upper arm 82.

The power transmitting device 13 includes a transmission 47 connected to an output shaft of the engine 12, a gear change pedal 48, a front drive shaft 51 and a rear drive shaft 52 connected to the front and back of the transmission 47, a front final reduction gear 53 connected to the front drive shaft 51 and attached to the vehicle body frame 11 side, and a rear final reduction gear 54 connected to the rear drive shaft 52.

The steering device 21 includes a steering shaft 56 attached to the upper front portion of the main frame 25 with a shaft holder 55 and a handle 57 attached to the upper end of the steering shaft 56. Reference numeral 61 designates a front fender which covers over the upper portions of the front disk wheels 17, 17, and reference numeral 62 designates a rear fender which covers over the upper portions of the rear disk wheels 18, 18.

The engine 12 is a four-cycle engine and includes a cylinder block 63, a cylinder head 64 attached to the upper portion of the cylinder block 63, an exhaust device 65 connected to the front portion of the cylinder head 64, an intake device 66 connected to the rear portion of the cylinder head 64, a valve mechanism 67 provided in the cylinder head 64, a piston 71 movable inserted into the cylinder block 63, a crankshaft 72 connected to the piston 71 via a connecting rod 71a, and an oil pan 73 attached to the lower portion of the cylinder block 63. Reference numeral 74 designates a cooling fan arranged in front of the engine 12 for forcedly cooling the engine 12.

Figure 2:
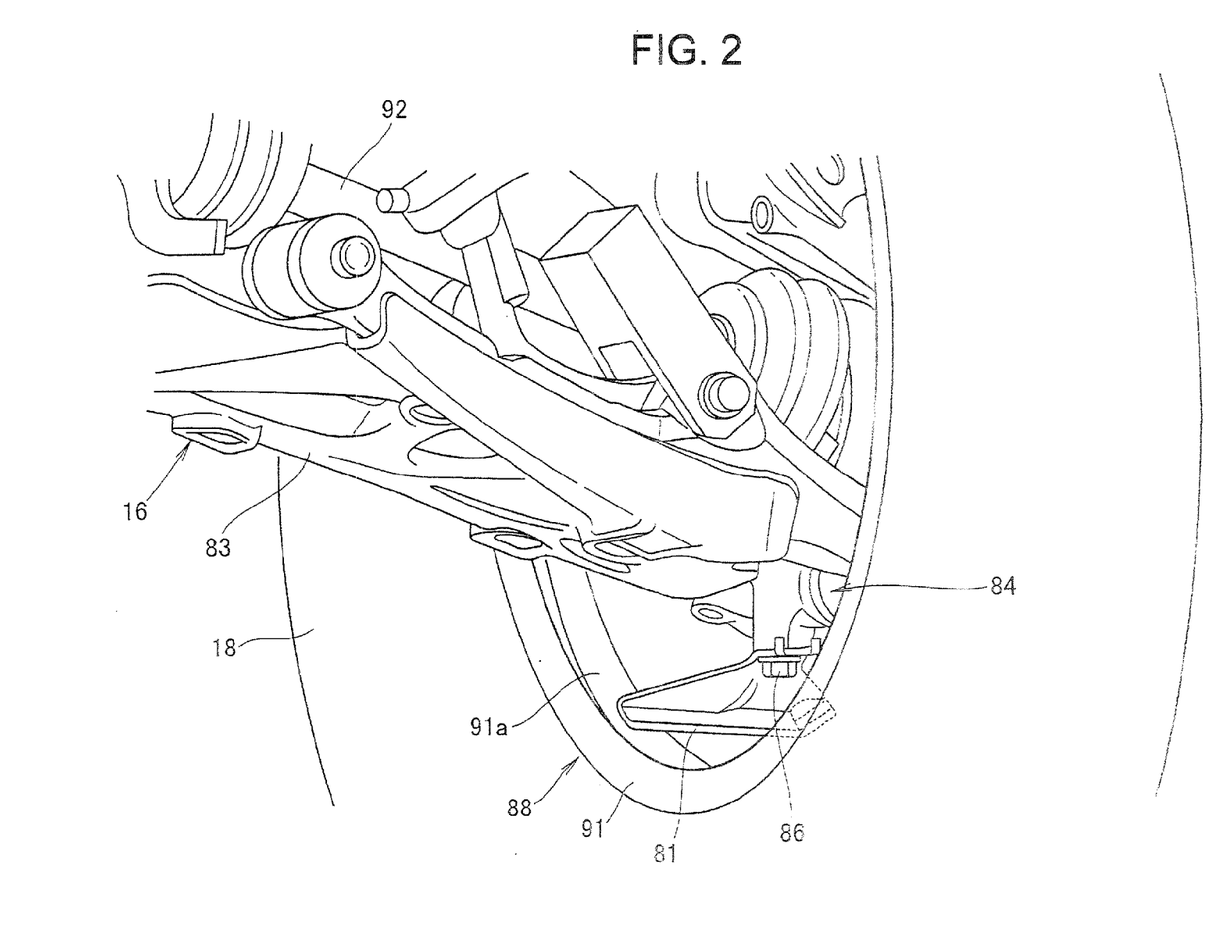
FIG. 2 is a perspective view of a principal portion illustrating the scraper structure according to the embodiment of the present invention.

FIG. 2 is a perspective view of a principal portion illustrating the scraper structure according to the embodiment of the present invention, illustrating a scraper 81 provided inside the rear disk wheel 18 on the rear left side.

More specifically, an upper arm (not shown) and a lower arm 83 which constitute the rear suspension 16 are attached to the vehicle body frame 11 (see FIG. 1) side so as to be capable of swinging in the vertical direction, a knuckle 84 is attached to the respective distal ends of the upper arm and the lower arm 83, and the scraper 81 is attached to the lower portions of the knuckles 84 with a screw bolt 86. Reference numeral 88 designates a disk wheel which constitutes the rear disk wheel 18, reference numeral 91 designates a rim which constitutes the disk wheel 88, and reference numeral 92 designates a drive shaft connected at one end to the rear final reduction gear 54 (see FIG. 1) and at the other end to the rear disk wheel 18 side.

Figure 3:
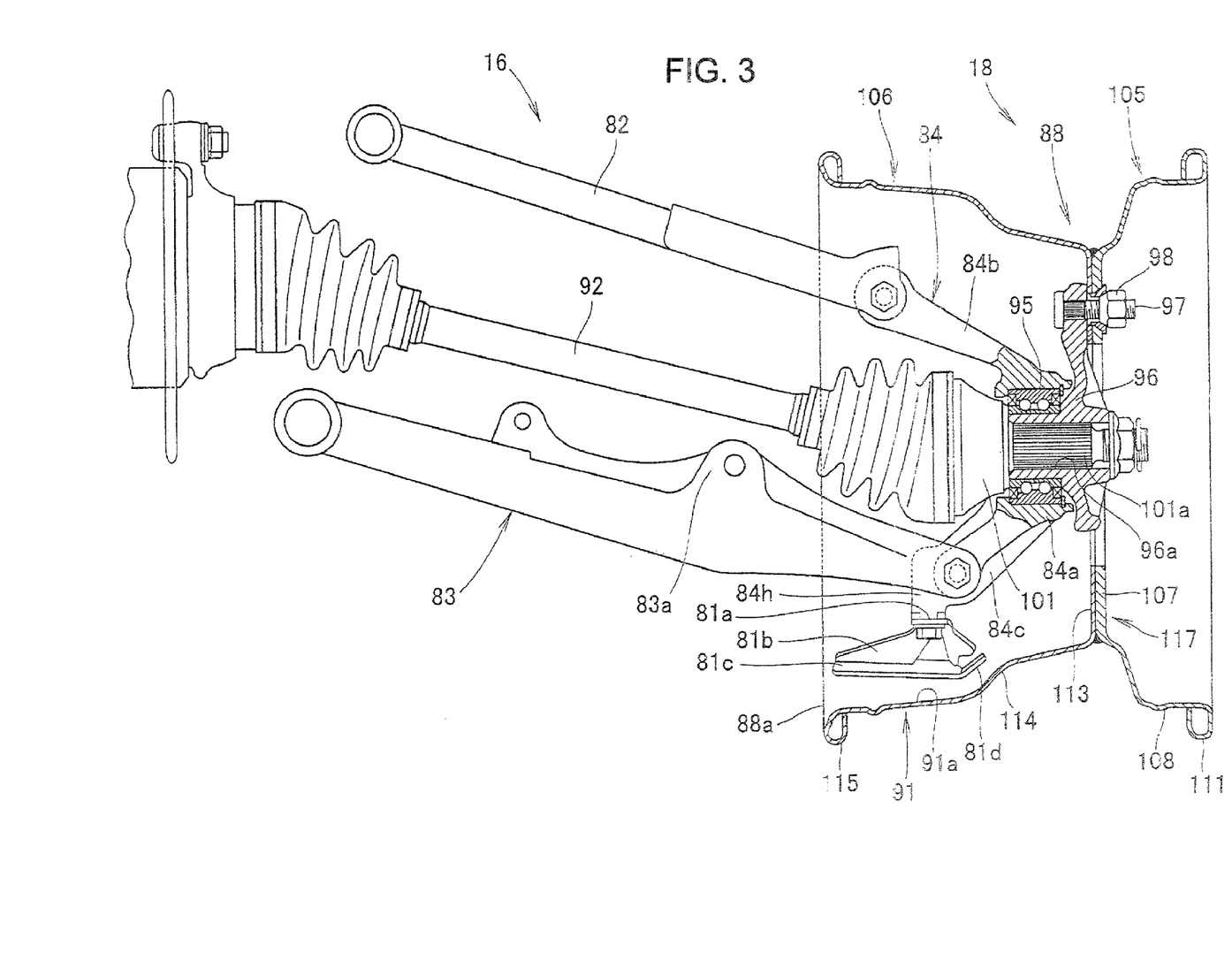
FIG. 3 is a front view illustrating a rear suspension according to the embodiment of the present invention.

FIG. 3 is a front view (partly in cross section) illustrating the rear suspension according to the embodiment of the present invention, and the rear suspension 16 includes the upper arm 82, the lower arm 83, the knuckle 84 supported by the upper arm 82 and the lower arm 83, a hub 96 rotatably supported by the knuckle 84 via a bearing 95, and the rear cushion unit 44 (see FIG. 1) connected to a cushion connecting portion 83a provided on the lower arm 83. The rear disk wheel 18 is attached to the hub 96 with a plurality of screw bolts 97 and nuts 98.

The hub 96 is formed with a female spline 96a to be spline-connected to a male spline 101a formed on a shaft portion 101 provided at the end portion of the drive shaft 92, and is driven by the drive shaft 92.

The knuckle 84 includes a cylindrical portion 84a to which a bearing 95 is fitted, an upper arm portion 84b extending integrally inwardly and obliquely upwardly from the cylindrical portion 84a, and a lower arm portion 84c extending integrally inwardly and obliquely downward from the cylindrical portion 84a. The scraper 81 is attached to the rear portion of the lower arm portion 84c.

The disk wheel 88 includes an outer disk wheel 105 press-formed integrally therewith and an inner disk wheel 106 press-formed integrally therewith and attached inside the outer disk wheel 105 in terms of the vehicle body.

The outer disk wheel 105 includes a plate-shaped disk portion 107 and a rim portion 108 formed integrally with the outer edge of the disk portion 107. Reference numeral 111 designates a flange provided on the rim portion 108.

The inner disk wheel 106 includes a plate-shaped disk portion 113 and a rim portion 114 formed integrally with the outer edge of the disk portion 113. Reference numeral 115 designates a flange provided on the rim portion 114.

The above-described disk portions 107, 113 are parts which are joined along the outer peripheries thereof by welding and constitute a disk 117 of the disk wheel 88.

The rim portions 108, 114 described above are parts which constitute the rim 91 of the disk wheel 88.

The scraper 81 is arranged along the rim 91, more specifically, an inner surface 91a of the rim portion 114 of the inner disk wheel 106.

Figure 4:
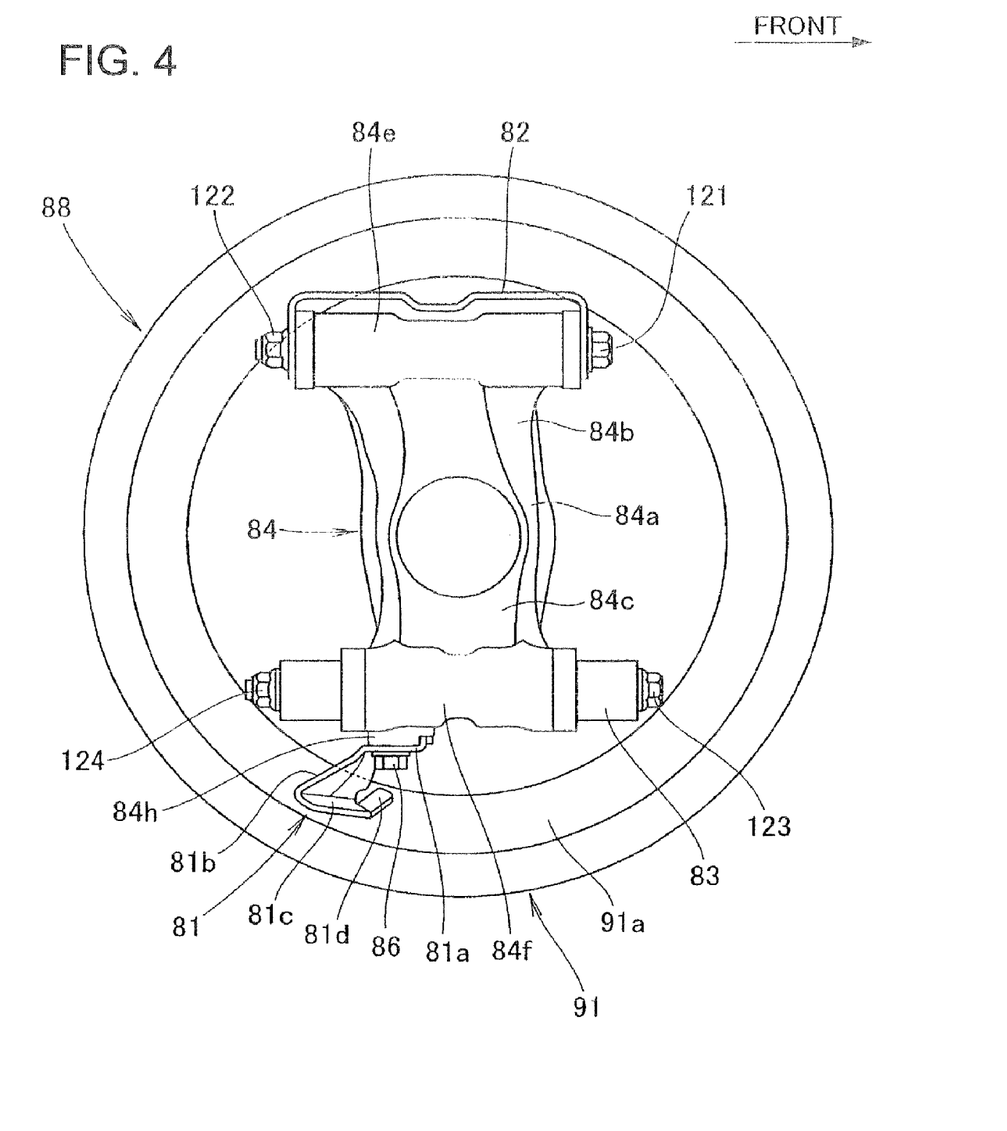
FIG. 4 is a side view illustrating a mounting state of a scraper according to the embodiment of the present invention.

FIG. 4 is a side view illustrating a mounting state of the scraper according to the embodiment of the present invention, when viewing the scraper 81 from inside the disk wheel 88.

The upper arm portion 84b and the lower arm portion 84c of the knuckle 84 are provided with cylindrical portions 84e, 84f at the distal ends thereof respectively, and the upper arm 82 and the lower arm 83 are swingably connected to the cylindrical portions 84e, 84f respectively via bearings (not shown). Reference numerals 121, 122 designate a screw bolt and a nut for connecting the upper arm 82 and the cylindrical portion 84e, and reference numerals 123, 124 designate a screw bolt and a nut for connecting the lower arm 83 and the cylindrical portion 84f.

The scraper 81 is attached to a scraper attachment 84h projecting downward from the lower rear portion of the cylindrical portion 84f of the lower arm portion 84c, and is arranged on the back side of the lower center of the rim 91. Therefore, mud or the like accumulated on the lower center of the rim 91, that is, on the lowest portion of the rim 91 may be removed immediately by the scraper 81 arranged on the back side thereof.

Figure 5:
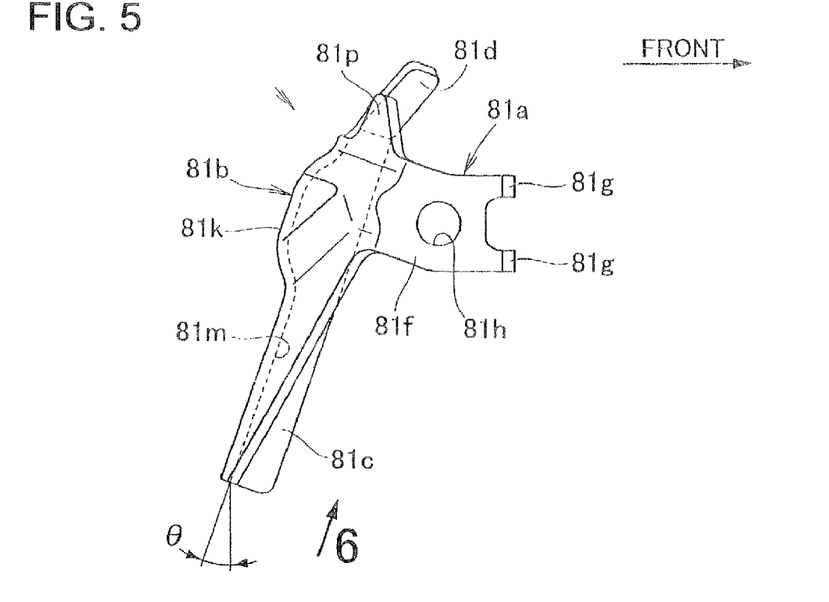
FIG. 5 is a plan view of the scraper according to the embodiment of the present invention.

FIG. 5 is a plan view of the scraper according to the embodiment of the present invention. The scraper 81 includes an attached portion 81a to be attached to the knuckle 84 (see FIG. 4), a first wall 81b extending downward from the attached portion 81a, a second wall 81c bent from the first wall 81b toward the front of the vehicle, and a third wall 81d formed on the first wall 81c at the outside end of the vehicle.

The attached portion 81a includes a flat portion 81f and upwardly bent portions 81g, 81g bent upward from the front end of the flat portion 81f. The flat portion 81f is formed with a screw bolt insertion hole 81h for inserting the screw bolt 86 (see FIG. 4) through. The upwardly bent portions 81g, 81g are portions to be hooked on the scraper attachment 84h (see FIG. 4) provided on the knuckle 84 designed for the purpose of preventing the scraper 81 from whirling.

The first wall 81b and the second wall 81c are inclined in such a manner that the inner sides thereof in terms of the vehicle body (lower side in the drawing) are positioned on the back side in terms of the vehicle body with respect to outer sides thereof in terms of the vehicle body (upper side in the drawing). Reference sign θ in the drawing designates an angle of sweepback of a front surface 81m of the first wall 81b. Reference numeral 81k is a rearwardly swelling portion provided on the first wall 81b.

Figure 6:
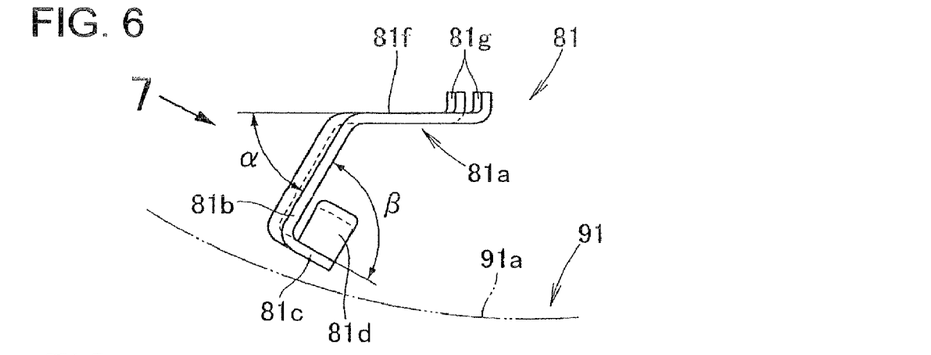
FIG. 6 is a view seen in the direction indicated by an arrow 6 in FIG. 5.

FIG. 6 is a view seen in the direction indicated by an arrow 6 in FIG. 5. The first wall 81*b* is a portion which is bent by an angle α with respect to the flat portion 81*f*.

The second wall 81*c* is a portion bent by an angle β with respect to the first wall 81*b*, extends substantially along the inner surface 91*a* of the rim 91, and is formed into an L-shape in cross section with respect to the first wall 81*b* and the second wall 81*c*. The angle β is, for example, 90°.

Mud, snow or the like accumulated on the inner surface 91*a* of the rim 91 of the disk wheel is scraped by the above-described second wall 81*c*, and the scraped mud, snow of the like is collected by the first wall 81*b* and is discharged from the disk wheel inwardly in terms of the vehicle body.

Figure 7:
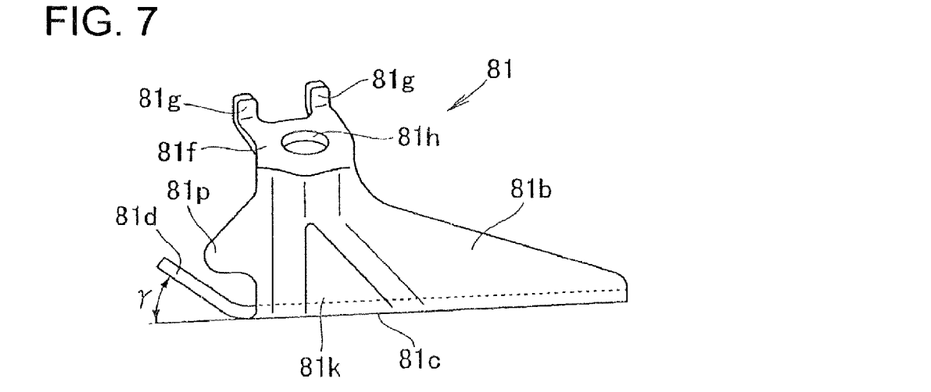
FIG. 7 is a view seen in the direction indicated by an arrow 7 in FIG. 6.

FIG. 7 is a view seen in the direction indicated by an arrow 7 in FIG. 6. The third wall 81*d* is a portion bent by an angle y with respect to the second wall 81*c*.

Mud, snow or the like collected by the first wall 81*b* is stopped by the third wall 81*d* inclined with respect to the first wall 81*b* so as not to be moved from the first wall 81*b* outwardly in terms of the vehicle body, and is guided inwardly in terms of the vehicle body.

Reference numeral 81*p* in the drawing is an extending portion extending from the first wall 81*b* outwardly in terms of the vehicle body, and serves as a receiving portion to prevent the mud, snow or the like stopped by the third wall 81*d* so as not to move to outside thereof in terms of the vehicle body from moving backward in terms of the vehicle body from the side of the third wall 81*d*, so that the mud, snow or the like is easily guided out of the disk wheel. Simultaneously, it serves as a wall extending from the first wall 81*b* toward the third wall 81*d* so as to eliminate a gap between the first wall 81*b* and the third wall 81*d*, so that flow of the mud, snow or the like is restricted and is guided out of the disk wheel (inwardly in terms of the vehicle body) further easily.

Figure 8A:
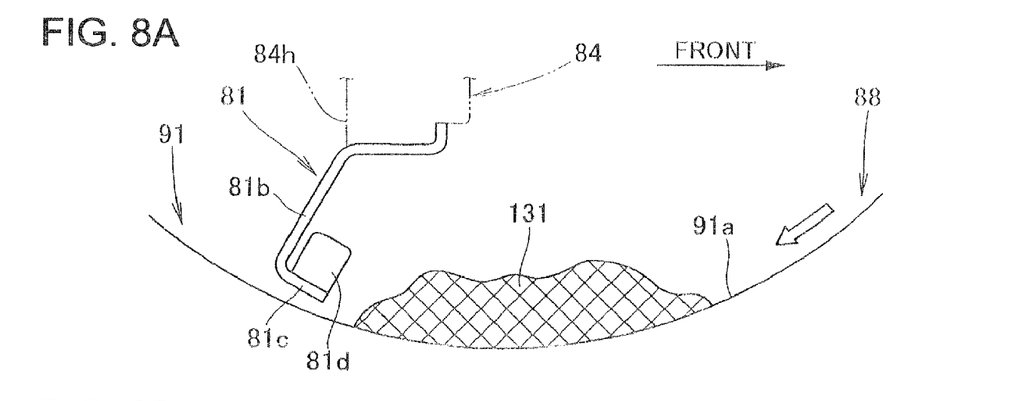
FIG. 8A, 8B and 8C are drawings illustrating operation of the scraper according to the embodiment of the present invention.
Figure 8B:
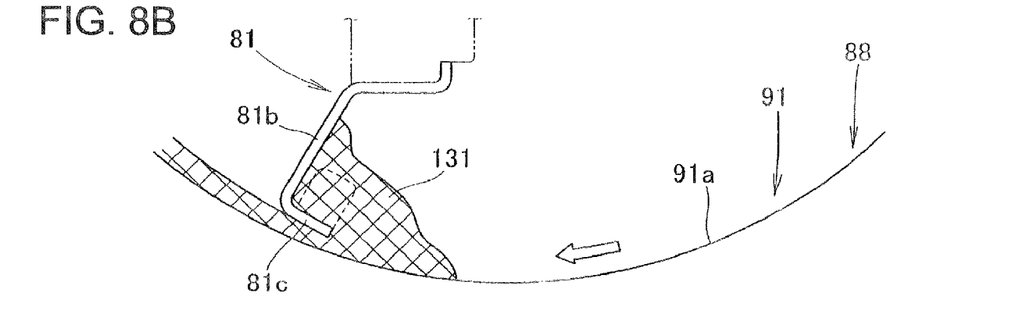
Figure 8C:
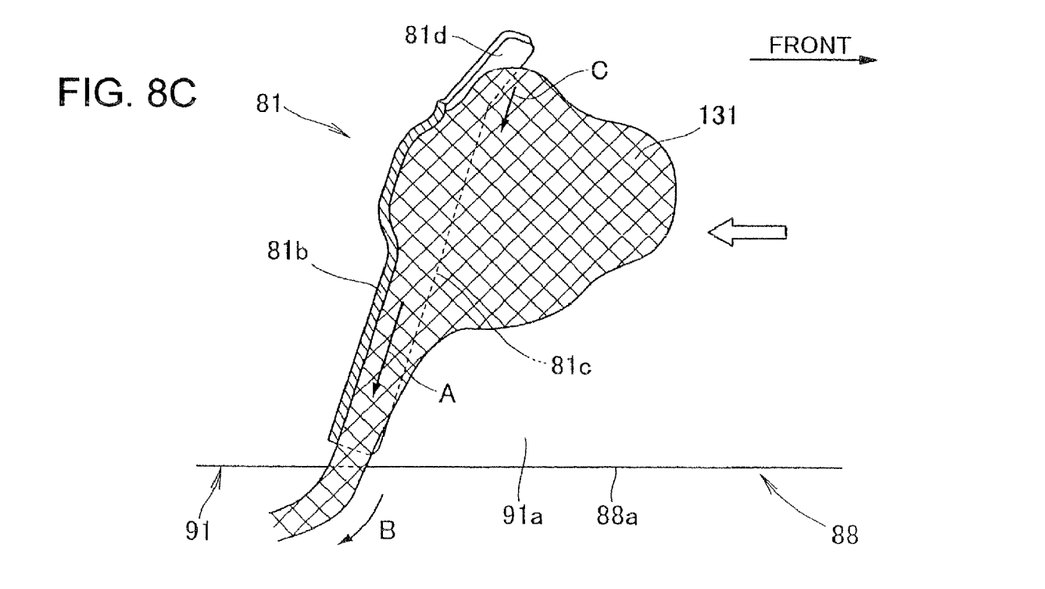

FIGS. 8(*a*) to (*c*) are drawings illustrating operation of the scraper according to the embodiment of the present invention. FIGS. 8(*a*) and (*b*) are side views from inside the disk wheel, and FIG. 8(*c*) is a plan view of the inner surface of the disk wheel. Hollow arrows in the drawings indicate the direction of rotation of the disk wheel 88.

FIG. 8(*a*) illustrates a state in which mud 131 is accumulated on the lower portion of the inner surface 91*a* of the rim 91 of the disk wheel 88. From this state, for example, when the vehicle is moved forward, and the disk wheel 88 is rotated as indicated by the hollow arrow in the drawing, the mud 131 is collected by the first wall 81*b* of the scraper 81 and is scraped gradually by the second wall 81*c* as shown in FIG. 8(*b*).

In this case, in FIG. 8(*c*), the mud 131 is moved from the outer side in terms of the vehicle body inwardly in terms of the vehicle body by the inclined first wall 81*b* as indicated by an arrow A and is discharged out of the disk wheel 88 as indicated by an arrow B. Reference numeral 88*a* designates an inner end surface of the disk wheel 88.

The mud 131 accumulated outside the inner surface 91*a* of the rim 91 in terms of the vehicle body is introduced inwardly in terms of the vehicle body by the inclined third wall 81*d* as shown in an arrow C and, as described above, is then discharged outside the disk wheel 88 by the first wall 81*b*.

In FIGS. 8(*a*) to (*c*) described above, the scraper 81 is formed into a member of an L-shape in cross section detachably attached to the lower surface of the knuckle 84, and one of two sides of the L-shape (that is, the first wall 81*b* and the second wall 81*c*) is positioned close to the inner surface 91*a* of the rim 91 of the lower portion of the disk wheel 88, so that formed into the second wall 81*c* serves as a blade which scrapes the mud 131 or the like on the inner surface 91*a* of the disk wheel 88. Therefore, when the mud 131 or the like is scraped by the second wall 81*c*, the scraped mud 131 or the like is hardly accumulated again on the inner surface 91*a* of the rim 91, whereby the mud 131 or the like can easily be discharged out of the disk wheel 88.

Since the mud 131 or the like scraped by the second wall 81*c* is introduced and discharged inwardly in terms of the vehicle body by inclining the scraper 81 in such a manner that the inner side thereof in terms of the vehicle body are positioned on the back side in terms of the vehicle with respect to outer side thereof in terms of the vehicle body, the scraped mud 131 or the like can easily be discharged out of the disk wheel 88.

In FIG. 7 and FIG. 8(*c*), since the scraper 81 is provided with the third wall 81*d* as a sub scraper which is inclined in such a manner that the inner side thereof in terms of the vehicle body is lower than the outer side thereof in terms of the vehicle body, the mud 131 or the like scraped by the scraper 81 can easily be moved inside the disk wheel 88 by the third wall 81*d*, and hence can easily be discharged out of the disk wheel 88.

In this embodiment, the scraper 81 is arranged inside the rear disk wheel 18 as shown in FIG. 2. However, the invention is not limited thereto, and the scraper 81 may be arranged inside the front disk wheel 17.

As shown in FIG. 6, the first wall 81*b* and the second wall 81*c* of the scraper 81 are formed into the L-shape in cross-section. However, the invention is not limited thereto, and the first wall 81*b* and the second wall 81*c* may be formed into a bent shape in cross section, (that is, the angle formed between the first wall 81*b* and the second wall 81*c* is an acute angle or an obtuse angle).

According to the embodiment of the present invention, a scraper structure for a vehicle includes a scraper provided on a knuckle which rotatably supports a wheel for scraping mud or the like accumulated inside a disk wheel of the wheel. The scraper is detachably attached to a lower surface of the knuckle, and the scraper includes an extending portion extending downwardly from the lower surface of the knuckle and inwardly in terms of the vehicle body and a bent portion formed by bending a lower end of the extending portion toward the front in terms of the vehicle body.

In this embodiment of the present invention, since the scraper is attached to the lower surface of the knuckle and hence is positioned in the vicinity of an inner surface of a rim of a lower portion of the disk wheel, mud or the like accumulated on the inner surface of the rim at the lower portion of the disk wheel is immediately scraped by the scraper, and the scraped mud or the like is hardly accumulated on the inner surface of the rim again. The bent portion scrapes the mud or the like accumulated on the inner surface of the rim at the lower portion of the disk wheel, and the extending portion collects the scraped mud or the like and discharges the same out of the disk wheel.

According to the embodiment of the present invention, the scraper is a member formed into an L-shape in cross section, and one of two sides of the L-shape is positioned close to the inner surface of the rim at the lower portion of the disk wheel and is formed into a blade which scrapes the mud or the like on an inner surface of the disk wheel.

In this embodiment of the present invention, the mud or the like accumulated on the inner surface of the rim at the lower portion of the disk wheel is immediately scraped by the blade of the scraper, so that the scraped mud or the like is hardly accumulated on the inner surface of the rim again.

According to the embodiment of the present invention, the extending portion is inclined in such a manner that the inner side thereof in terms of the vehicle body is positioned on the back side in terms of the vehicle with respect to the outer side thereof in terms of the vehicle body.

In this embodiment of the present invention, the scraped mud or the like is introduced inwardly in terms of the vehicle body and rearwardly in terms of the vehicle and is discharged out of the rim of the disk wheel by the scraper which is inclined in such a manner that the inner side thereof in terms of the vehicle body is positioned on the back side in terms of the vehicle with respect to the outer side thereof in terms of the vehicle body.

According to the embodiment of the present invention, a sub scraper is provided outside the bent portion in terms of the vehicle body.

In this embodiment of the present invention, the mud or the like scraped by the scraper is intercepted by the sub scraper, so that it can hardly be moved outward in terms of the vehicle body.

In this embodiment of the present invention, the sub scraper is inclined in such a manner that the inner side thereof in terms of the vehicle body is lower than the outer side thereof in terms of the vehicle body.

In this embodiment of the present invention, the mud or the like scraped by the scraper is easily moved outside the disk wheel by the sub scraper which is inclined in such a manner that the inner side thereof in terms of the vehicle body is lower than the outer side thereof in terms of the vehicle body.

In the embodiment of the present invention, the scarper is detachably attached to the lower surface of the knuckle, and the scraper includes the extending portion extending downwardly from the lower surface of the knuckle and inwardly in terms of the vehicle body and the bent portion formed by bending the lower end of the extending portion toward the front in terms of the vehicle body. Therefore, the scraper can be arranged close to the inner surface of the rim at the lower portion of the disk wheel, so that when the mud or the like accumulated on the inner surface of the rim at the lower portion of the disk wheel is scraped, the scraped mud or the like is hardly accumulated on the inner surface of the rim again, whereby the mud or the like is easily discharged out of the disk wheel.

In the embodiment of the present invention, the scraper is the member formed into the L-shape in cross section, and one of two sides of the L-shape is positioned close to the inner surface of the rim at the lower portion of the disk wheel and is formed into the blade which scrapes the mud or the like on the inner surface of the disk wheel. Therefore, the mud or the like accumulated on the inner surface of the rim is scraped by the bent portion, and the scraped mud or the like is collected and discharged out of the disk wheel by the extending portion. Therefore, the mud or the like on the disk wheel is discharged efficiently.

In the embodiment of the present invention, the extending portion is inclined in such a manner that the inner side thereof in terms of the vehicle body is positioned on the back side in terms of the vehicle with respect to the outer side thereof in terms of the vehicle body. Therefore, the scraped mud or the like is easily discharged out of the disk wheel.

In the embodiment of the present invention, the sub scraper is provided outside the bent portion in terms of the vehicle body. Therefore, the mud or the like scraped by the scraper is prevented from moving easily outwardly in terms of the vehicle body, so that the mud or the like is hardly accumulated on the rim again.

In the embodiment of the present invention, the sub scraper is inclined in such a manner that the inner side thereof in terms of the vehicle body is lower than the outer side thereof in terms of the vehicle body. Accordingly, the mud or the like scraped by the scraper is easily moved inwardly in terms of the vehicle body by the sub scraper, and is discharged easily out of the disk wheel.

The scraper structure for a vehicle according to the embodiment of the present invention is suitable for a rough-terrain traveling vehicle.

It is obvious that the present invention is not limited to the above-described embodiment, but can be applied to, for example, motorcycles or three-wheeled vehicles without limiting to the saddle-ride type four-wheeled vehicles, and various modifications can be made in a range without departing from the gist of the invention.

What is claimed as new and is desired to be secured by letters patent of the United States is:

1. A scraper structure for a vehicle comprising:
    a scraper for scraping material accumulated inside a disk wheel of a wheel, the scraper being detachably attached to a lower surface of a knuckle which rotatably supports the wheel, the scraper comprising:
    an extending portion extending inwardly in terms of a vehicle body and downwardly from the lower surface of the knuckle; and
    a bent portion formed by bending a lower end of the extending portion toward a front in terms of the vehicle body,
    wherein the scraper has an L-shape in cross section,
    wherein one of two sides of the L-shape is positioned close to an inner surface of a rim at a lower portion of the disk wheel and is formed into a blade which is configured to scrape the material accumulated on an inner surface of the disk wheel,
    wherein a sub scraper is provided outside the bent portion in terms of the vehicle body, and
    wherein the sub scraper is inclined in such a manner that an inner side of the sub scraper in terms of the vehicle body is lower than an outer side of the sub scraper in terms of the vehicle body.

2. The scraper structure according to claim 1, wherein the extending portion has an inner side in terms of the vehicle body and an outer side in terms of the vehicle body, and wherein the extending portion is inclined such that the inner side is positioned closer to a rear side in terms of the vehicle than the outer side.

* * * * *